UNITED STATES PATENT OFFICE.

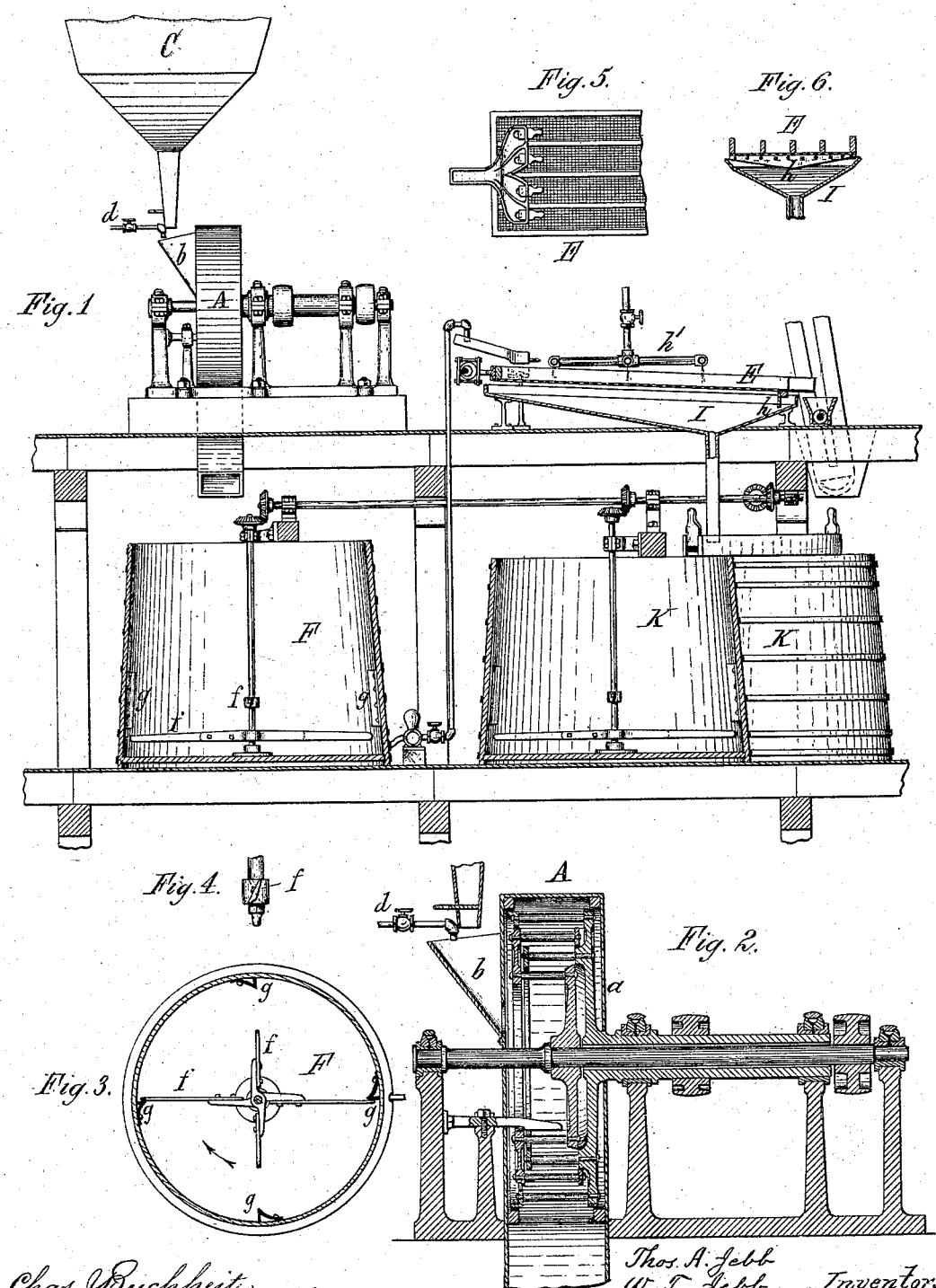

THOMAS A. JEBB AND WILLIAM T. JEBB, OF BUFFALO, NEW YORK.

METHOD OF OBTAINING STARCH FROM INDIAN CORN AND OTHER GRAIN.

SPECIFICATION forming part of Letters Patent No. 241,666, dated May 17, 1881.

Application filed February 3, 1881. (No model.)

*To all whom it may concern:*

Be it known that we, THOMAS A. JEBB and WILLIAM T. JEBB, both of the city of Buffalo, in the county of Erie and State of New York, have invented new and useful Improvements in Methods of Obtaining Starch from Indian Corn and other Grain, of which the following is a specification, reference being had to the accompanying drawings.

This invention relates to an improvement in the manufacture of starch from cereals, more especially Indian corn, and it has for its object to simplify the mode of treatment of the cereals and the apparatus employed, and to increase the yield of starch.

In the process heretofore most generally employed in manufacturing starch from Indian corn the latter is first soaked in warm water and then ground with water between mill-stones, and the starch suspended in the water is separated from the bran or woody and fibrous matter and the gluten by running the liquid over shaking-sieves and settling-vats and tables. In this treatment of the cereals a large proportion of the gluten and bran is ground up and passes with the starch through the meshes of the sieves into the settling-tanks, where the gluten is separated from the starch by adding alkali and repeatedly washing the starch. The gluten which the shaking-sieves have failed to separate from the starch is therefore not only lost, as it cannot be used for feed after being treated with alkali, but its subsequent separation from the starch involves, aside from the employment of alkali, a considerable expenditure of power in agitating the material. Furthermore, a considerable portion of the starch is smeared over the fragments of gluten and bran in grinding the corn, and passes with the gluten and bran over the tail ends of the shaking-sieves and into the feed.

Our invention is designed to remedy these defects; and it consists, principally, in reducing the grain for obtaining starch therefrom by whipping or beating the grain together with a stream of water until the bran and gluten are reduced to coarse fragments, when the starchy portions are finely pulverized, whereby the starch is loosened and washed from the fragments of bran and gluten; also, in obtaining the starch from grain by beating the grain together with a stream of water, then commingling the material discharged from the beating-machine to produce a liquid of uniform gravity, and then separating the starch suspended in the water from the offal by sifting.

In the accompanying drawings, Figure 1 is an elevation showing the general arrangement of the apparatus for carrying out our improved process. Fig. 2 is a sectional elevation of the disintegrator. Fig. 3 is a top-plan view of the agitating-tub. Fig. 4 is an end view of one of the rotating stirrers. Fig. 5 is a top-plan view of the upper portion of the shaking-sieves. Fig. 6 is a cross-section thereof.

Like letters of reference refer to like parts in the several figures.

A represents a disintegrating-machine of any suitable and well-known construction—a machine of the construction shown in Fig. 2, provided with several concentric rows of pins or beaters revolving in opposite direction, being preferably employed. This machine is provided with a suitable casing, $a$, which incloses the disintegrating disks or pins, and which is provided with a feed-hopper, $b$, near its center. The grain—steeped or not, as may be most desirable—is introduced into this hopper $b$ from a bin, C, together with a stream of water from a pipe, $d$. The grain is broken up by the disintegrating-pins, and the starchy portions of the kernels are completely detached from the outer harder portions thereof, taken up by the water at the moment that they become detached, and the harder fragments are at the same time washed and freed from the adhering starch by the water-spray which is distributed through the entire machine by the disintegrating-pins. The grinding of a portion of the bran and gluten to as fine a state as the starch is by this machine avoided, and the material is discharged from the machine in a form in which the starch is readily separated from the bran and gluten.

E represents a shaking-sieve, to which the material discharged from the disintegrator A may be taken directly, for the purpose of separating the bran and gluten from the starch; but the material is preferably first collected from the several disintegrators in an agitating-tank, F, where the different batches of disintegrated material are thoroughly mixed and their gravity equalized before the material is taken to the separator. The tank F is provided with two or more rotating stirrers, $f$, and one or more projecting breakers, $g$. The latter are preferably made of the form shown in Fig. 3, to throw the material from the wall of the tub inward, and the stirrers $f$ are made inclined, as shown in Fig. 4, to lift the material. The sieve E is provided, near its tail end, with a gather-board, $h$, secured to the under side of the sieve, for the purpose of arresting any liquid which may flow along the under side of the sieve, and causing such liquid to drop into the liquid-receptacle I underneath the sieve, instead of passing into the feed-box at the tail end of the sieve.

$h'$ are perforated pipes, through which sprays of water are discharged upon the surface of the shaking-sieves. The liquid is pumped from the agitating-tank F to the sieve E, which effects a separation of the starch from the bran and gluten. The starch is washed through the meshes of the sieves by the water-spray, while the bran and gluten pass over the tail of the sieve, and are carried to a convenient receptacle by an elevator or conveyer. The liquid, carrying the starch in suspension, is collected in the tubs K, and then treated in any ordinary and well-known manner for the production of starch, grape-sugar, glucose, spirits, or any other product, as may be desired.

By this method of treating the grain the bran and gluten are more completely separated from the starch, and the various expedients ordinarily resorted to for removing the gluten from the starch after sifting are, to a large extent, rendered superfluous, the loss of starch by carrying it off with the offal is prevented, the loss of gluten by treatment with alkali is largely reduced, and much less power is required for reducing the grain than when millstones are employed.

We claim as our invention—

1. As an improvement in the art of obtaining starch from grain, the method of reducing the grain by whipping or beating it together with a stream of water until the bran and gluten are reduced to coarse fragments, when the starchy portions of the grain are finely pulverized, whereby the starch is loosened and washed from the fragments of bran and gluten, substantially as set forth.

2. The method of obtaining starch from grain, which consists in reducing the grain by whipping or beating it together with a stream of water until the bran and gluten are reduced to coarse fragments, when the starchy portions of the grain are finely pulverized, then agitating the reduced grain, whereby the gravity of the liquid mass is rendered uniform, and then separating the starchy liquid from the bran and gluten by sifting, substantially as set forth.

THOMAS A. JEBB.
WILLIAM T. JEBB.

Witnesses:
JNO. J. BONNER,
EDW. J. BRADY.